United States Patent [19]

Chouteau et al.

[11] 4,324,327

[45] Apr. 13, 1982

[54] METHOD AND APPARATUS FOR CLEANING CONVEYOR BELTS BY MEANS OF A VIBRATING CABLE OR GROUP OF CABLES

[76] Inventors: Henri Chouteau, Villa Bel Air, Montgobert 02600 Villers-Cotteret; Gilbert Lagros, 4, rue de Nahan, 54490 Piennes, both of France

[21] Appl. No.: 175,587

[22] Filed: Aug. 5, 1980

[30] Foreign Application Priority Data

Aug. 10, 1979 [FR] France ............................... 79 20487

[51] Int. Cl.³ ............................................. B65O 45/00
[52] U.S. Cl. .................................. 198/497; 15/256.5; 198/494
[58] Field of Search ............... 198/494, 497, 498, 499; 474/92; 15/256.5

[56] References Cited

U.S. PATENT DOCUMENTS

| 2,681,137 | 6/1954 | Davis | 198/494 |
| 2,878,926 | 3/1959 | Harty . | |
| 2,885,069 | 5/1959 | Bowen | 198/494 |

FOREIGN PATENT DOCUMENTS

| 3462 | 8/1979 | European Pat. Off. . |
| 801144 | 12/1950 | Fed. Rep. of Germany . |
| 1051725 | 8/1959 | Fed. Rep. of Germany . |
| 2162175 | 4/1973 | Fed. Rep. of Germany . |
| 1420666 | 11/1965 | France . |
| 2264743 | 10/1977 | France . |

Primary Examiner—Jeffrey V. Nase
Attorney, Agent, or Firm—Posnack, Roberts, Cohen & Spiecens

[57] ABSTRACT

A method and apparatus for cleaning conveyor belts by a transverse cable. An upwards pressure is exerted on the belt by the cable to raise the edges of the belt, and this causes the cable to vibrate in the direction of travel of the belt causing the cable to clean the belt.

12 Claims, 2 Drawing Figures

METHOD AND APPARATUS FOR CLEANING CONVEYOR BELTS BY MEANS OF A VIBRATING CABLE OR GROUP OF CABLES

FIELD OF THE INVENTION

The present invention relates to a cleaning device for removing deposits of products which remain on a conveyor belt.

BACKGROUND OF THE INVENTION

As is known, poor cleaning leads to deterioration of a conveyor belt.

In the state of the art, systems with scrapers, brushes and the like have been proposed, which are relatively ineffective, cause wear and damage the belt, must frequently be replaced and rapidly lose their effectiveness.

The cleaning of conveyor belts by means of a wire, piano string or cable has also been known for a very long time. In the majority of these devices, this wire or cable is located on the periphery of the main drum. The wire is either immobile or driven with a receiprocating movement, transversely relative to the belt.

However, these processes prove to be relatively unsatisfactory. In fact, if the pressure exerted by the wire against the belt is low, the cleaning effectiveness is virtually zero, and if the pressure exerted is high, the wire wears very rapidly and frequent interruptions for its adjustment or replacement are necessary.

The troublesome particles to be removed are subjected to four main forces, namely their weight, their inertia, their actual adhesion to the belt and their adhesion to one another. Placed in contact with the belt, a cable at rest or driven with a movement along its axis only makes it possible to overcome the inertia forces and, partially, the forces of adhesion to the belt. In fact, the particles encountering the obstacle created by the cable stick to the latter and finally pass between the belt and the cable. By causing the cable to vibrate, an attempt has thus been made to free the cable of the agglomerates, which thus become dislodged.

In the state of the art, the vibrations can be produced in a number of ways using various sources, namely an electromagnet, an unbalanced motor or the like.

OBJECT OF THE INVENTION

The object of the present invention is to increase cleaning effectiveness with a special vibratory movement of the cable or wire (and to reduce the need for interruptions, which are always a significant cause of accident) by producing a suitable device.

SUMMARY OF THE PRESENT INVENTION

It has been discovered that, surprisingly, it is possible to make use of the resistance offered by the conveyor belt. In fact, it has been discovered that raising the edges of the belt transversely creates, on the cable which passes underneath it, a longitudinal variation, that is to say a variation along the cable, in the frictional force. The effect of this force, the minimum amplitude of which lies essentially along the axis of the belt, is to cause the cable to vibrate in the plane of advance of the belt. The explanation of this is complex, in the same way as for any vibratory phenomenon. The determining component seems to be the longitudinal variations in the frictional forces on the cable, due to the actual curvature of the belt (increase in the internal tension on the edges of the belt.) These forces together cause complex elastic deformations of the cable, causing its periodic "detachment" and its vibration.

Thus, according to a first aspect of the invention there is provided a method of cleaning conveyor belts by means of a run of cable arranged transversely, relative to the direction of travel of the belt, between two support points independent of the belt and in contact with the underside of the slack belt, the method comprising raising the lateral edges of the slack belt by arranging of each support point for the cable slightly above the plane defined by the slack belt in the rest position, that is to say when the belt is not subjected to any stress from the cable, whereby the tension of the cable, which thus exerts a pressure at every point over the whole width of the belt, the pressure passing through a minimum value at the level of the longitudinal axis of symmetry of the belt, so as to cause the cable to vibrate effectively, each point on the cable thus being driven with an oscillatory movement in the direction of travel of the belt, while at the same time remaining in close contact with that part of the belt which corresponds thereto.

A second aspect of the invention provides apparatus for cleaning a conveyor belt having lateral edges and a longitudinal axis, the apparatus comprising at least two support points independent of the belt and at least one run of cable arranged transversely, relative to the direction of travel of the belt, between the support points and in contact with the underside of the slack belt, the arrangement being such that in use the lateral edges of the slack belt are raised due to the construction wherein each support point for the cable is slightly above the plane defined by the slack belt in the rest position, that is to say when the belt is not subjected to any stress from the cable, and the tension of the cable, which thus exerts a pressure at every point over the entire width of the belt, the pressure passing through a minimum value at the level of the longitudinal axis of the said belt, so as to cause the cable to vibrate effectively, each point on the cable thus being driven with an oscillatory movement in the direction of travel of the belt, while at the same time remaining in close contact with that part of the belt which corresponds thereto.

According to the invention, a high pressure is thus exerted upwards on the slack side of the belt by the transverse cable located under the slackside. This pressure is not exerted in a constant manner over the whole width of the belt, but on the contrary, by the system which causes the lateral edges of the belt to be raised by the cables. The central part of the belt must be virtually unaffected.

Advantageously, a system of this type consists of a device for supporting the cable placed on each side and slightly above the plane of the slack side, in the rest position. When the cable is stretched between these supporting devices, the slack side is deformed as indicated above.

It has been discovered that this results not in a permanent deformation of the cable in the direction of travel of the slack side, but, on the contrary, in a forwards-and-backwards oscillatory movement of the cable, relative to the direction of travel of the belt, the cable remaining essentially in contact with the slack side and thus ensuring very effective cleaning.

It has also been found that, contrary to the expectations of those skilled in the art, a high pressure exerted by the cable on the belt does not always cause high wear on the cable and/or the belt. On the contrary, and surprisingly, the device according to the invention reduces the wear on the cable and the belt, despite the very high pressure which it uses.

Pulleys for guiding the cable are used, in particular, as the supporting device. By arranging a system of idler pulleys for the cable, in a known manner, it is possible to use a group of parallel portions of the cable, and this of course increases the effectiveness.

It is thus possible to clean rubberized belts (textile, plastics or metal core). These belts must not possess roughness, and this excludes herring-bone belts and connections made by fasteners.

All ordinary cables or wires, or netting, are suitable; the constituent material and the diameter affect the rate of wear and hence the period for which an exchangeable reel can be left unattended.

The best results have been obtained with a steel cable of a diameter of 6 to 8 mm, with a base wire of 7/10 mm.

The raising of the edges of the belt and the tension of the cable are the essential components in the adjustment of the device. This tension must enable the edges to be raised to the chosen extent. The order of magnitude is 1,000 N (100 kgf) for belt widths of less than 1,000 mm and 2 to 3,000 N for greater widths.

Raising of the edges of the belt by 1 to 2% of its width generally gives the best results. 10% appears to be a maximum.

It has not been possible to define a limiting speed of travel; in fact, at the usual speeds of travel, which are of the order of 0.2–1 m/second, the device according to the invention is effective.

With four doubled-back sections of one and the same cable, stretched between pulleys on either side of the belt, it has been possible to achieve a degree of removal of the residual materials of more than 95%, regardless of the customary product conveyed, under the above conditions.

It is possible to renew the portion or portions of active cable by simply winding the cable between a feed reel and a take-up reel; the renewal advantageously represents about 1% of the running rate of the installation; the wear is thus minimal and the maintenance is virtually zero.

BRIEF DESCRIPTION OF THE DRAWINGS

The invention will be further described by way of example with reference to the accompanying drawings, in which.

DESCRIPTION OF PREFERRED EMBODIMENT

The illustrated device comprises two reels a and b, one (A) being a feed reel which carries new cable, and the other (B) being the take-up reel which stores the worn cable which has been rendered unusable.

Between the two reels, a set of conventional idler pulleys (C) makes it possible to increase the number of sections in service under the slack side of a conveyor belt (I) and thus to obtain the desired degree of cleaning effectiveness. A damper, which is placed along the path of the cable and which can consist of a spring (D) or any other system, permits the controlled slackening of the cable in the event of a significant impact or the passage of a foreign body, thus ensuring a degree of safety in use, and protection of the conveyor belt.

The group of sections formed in this way is then positioned and stretched so as to ensure a certain raising of the edges of the belt discussed previously in the summary of the invention until the desired degree of vibration is obtained, as discussed previously in the summary of the invention above.

This raising is effected by simply adjusting the height of the apparatus, for example, with the aid of one or more support rollers (H). For more rigid belts, raising rollers (G) can be positioned at the edges of the belt.

The cable is renewed by driving the reel (B). The period for which the device can be left unattended depends only on the length of the cable stored on the reel (A), which can be as much as several hundred metres. The maintenance operations, which are always dangerous, can thus be dispensed with for more than a year.

The cable is wound onto the reel (B) by means of a geared motor or other suitable system (for example a ratchet wheel), which acts, on the one hand on a capstan (E), which is provided with an adjustable braking system ensuring a constant tension and a constant speed of unwinding of the cable and, on the other hand, on the reel (B) via a torque-limiting device, which makes it possible to compensate for variations in linear speed of the cable on the reel. The cable is guided, during winding, by means of a movable arm (F).

An adjustable clock and timer unit controlled by the running of the conveyor belt makes it possible to trigger the renewal cycle of the cable as a function of its wear. This cycle can be continuous.

The cycle can also be triggered by any system which measures the actual wear on the cable.

Figure 1:
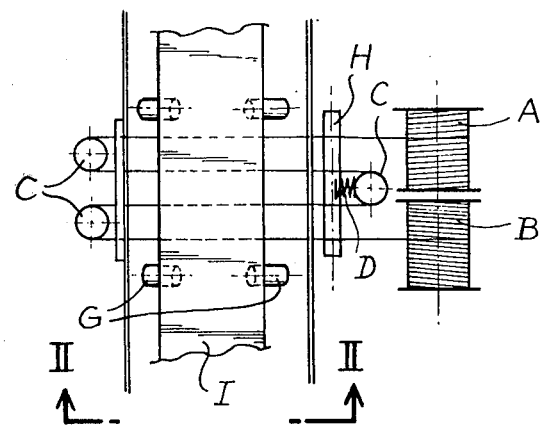
FIG. 1 schematically shows a top view of the preferred device.
Figure 2:
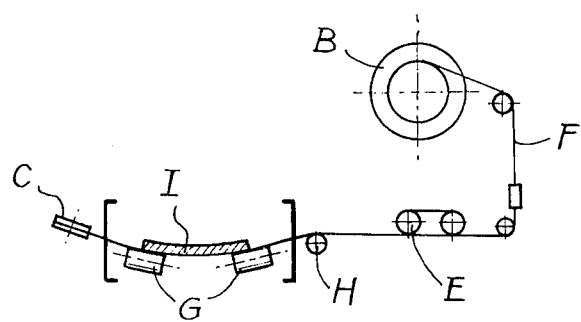
FIG. 2 schematically shows the device of FIG. 1 in section along line II—II.

In a preferred embodiment four cable sections are provided as shown in FIG. 1.

With 400 m of cable, it has been possible to achieve at least 2,000 hours of operation without any manual intervention.

We claim:

1. A method of cleaning a conveyor belt comprising arranging a cable transversely, relative to the direction of travel of the belt, between two support points independent of the belt and in contact with the underside of the belt when the belt is slack, and raising lateral edge portions of the slack belt with respect to the central portion of the belt by positioning each support point for the cable slightly above a plane defined by the slack belt in the rest position when the belt is not subjected to any stress from the cable, whereby a tension is produced in the cable, which thus exerts a pressure on the belt over the entire width of the belt, the pressure being a minimum at the longitudinal axis of symmetry of the belt and increasing towards said edge portions, so as to cause the cable to vibrate during travel of said belt, each point on the cable being driven with an oscillatory movement in the direction of travel of the belt, while at the same time remaining in close contact with that part of the belt which corresponds thereto to effect a cleaning of the belt.

2. A method according to claim 1, wherein several runs of cable are arranged beneath the belt approximately parallel to one another in the direction of travel of the belt.

3. A method according to claim 2, wherein the runs of cables are formed by a single cable which is mounted on support points and is doubled back several times, transversely relative to the belt, each support point being located slightly above the plane defined by the slack belt in the rest position.

4. A method according to claim 3, wherein the support points are formed by idler pulleys, at least some of which are mounted elastically.

5. A method according to claim 1, comprising advancing the cable transversely, relative to the belt from a feed reel and towards a take-up reel.

6. A method according to claim 1, comprising supplementing the raising of the edge portions of the belt by the cable by applying lateral bearing rollers against the edge portions of the belt.

7. Apparatus for cleaning a conveyor belt having lateral edges and a longitudinal axis, the apparatus comprising at least two support points independent of the belt and at least one run of cable arranged transversely, relative to the direction of travel of the belt, between the support points and in contact with the underside of the belt, each support point for the cable being slightly above a plane defined by the belt when slack in a rest position in which the belt is not subjected to any stress from the cable such that the lateral edges of the slack belt are raised with respect to the center of the belt and the cable is subject to tension which exerts pressure on the belt over the entire width of the belt, the pressure being a minimum at the longitudinal axis of the belt, so as to cause the cable to vibrate during travel of said belt, each point on the cable being driven with an oscillatory movement in the direction of travel of the belt, while at the same time remaining in close contact with that part of the belt which corresponds thereto to effect a cleaning of the belt.

8. An apparatus according to claim 7, wherein several runs of cable are arranged beneath the belt approximately parallel to one another in the direction of travel of the belt.

9. An apparatus according to claim 8, wherein the runs of cable are formed by a single cable which passes on said support points and is doubled back and forth several times, transversely relative to the belt.

10. An apparatus according to claim 9, wherein the support points comprise idler pulleys at least some of which are mounted elastically.

11. An apparatus according to claim 7 comprising a feed reel and take-up reel, said cable travelling transversely, relative to the belt from the feed reel to the take-up reel.

12. Apparatus according to claim 7 comprising lateral bearing rollers for engaging and raising the belt edges.

* * * * *